United States Patent [19]

Sukigara

[11] Patent Number: 5,287,225
[45] Date of Patent: Feb. 15, 1994

[54] SYSTEM FOR POSITIONING A HEAD IN A TRANSVERSE REFERENCE POSITION ON A MULTITRACK DIGITAL MAGNETIC TAPE

[75] Inventor: Motoyuki Sukigara, Tokyo, Japan

[73] Assignee: TEAC Corporation, Tokyo, Japan

[21] Appl. No.: 738,127

[22] Filed: Jul. 30, 1991

[30] Foreign Application Priority Data

Jul. 31, 1990 [JP] Japan ................... 2-203342

[51] Int. Cl.⁵ ............................. G11B 27/36
[52] U.S. Cl. .................. 360/31; 360/77 B; 360/67; 360/75; 360/77.12
[58] Field of Search ............ 360/77.12, 77.13, 75, 360/78.01, 31, 67

[56] References Cited

U.S. PATENT DOCUMENTS

4,318,142  3/1982  Ravizza ............... 360/77.13
4,422,111 12/1983  Moeller et al. ........ 360/72.1
4,455,582  6/1984  Yanagida et al. ....... 360/77.12
4,796,125  1/1989  Karsh ................. 360/77.12

Primary Examiner—Robert J. Pascal
Assistant Examiner—Haissa Philogene
Attorney, Agent, or Firm—Woodcock Washburn Kurtz Mackiewicz & Norris

[57] ABSTRACT

A method of, and an apparatus for, positioning a record/playback head assembly in a transverse reference position on one edge of a multitrack magnetic tape having no track identification data or other positioning patterns prerecorded thereon. A stream of transverse head positioning data, typically representative of serial numbers 1-255, is first written by the record/playback head assembly longitudinally on the tap in a selected transverse position intermediate the opposite edges of the tape. The data are subsequently read and checked for errors. If the thus detected errors are less than a predetermined number, the record/playback head assembly is moved a unit distance toward one tape edge. A similar cycle of operations is repeated until errors are found in the read stream of transverse head positioning data to the predetermined number or more.

10 Claims, 4 Drawing Sheets

SYSTEM FOR POSITIONING A HEAD IN A TRANSVERSE REFERENCE POSITION ON A MULTITRACK DIGITAL MAGNETIC TAPE

BACKGROUND OF THE INVENTION

My invention relates generally to the art of data recording on tape media, and particularly to apparatus for the recording and reproduction of digital data on multitrack magnetic tapes packaged in cassette form or otherwise preloaded in similar reel to reel envelopes. More particularly, my invention pertains to a method and means in such apparatus for positioning a data transducer or head in a transverse reference position on one edge of the tape in order to enable control over the subsequent transverse head location with respect to a plurality or multiplicity of parallel record tracks on the tape.

Multitrack magnetic tapes have found widespread acceptance as compact and inexpensive data storage media. Such a tape permits digital data to be recorded thereon along a plurality or multiplicity of tracks extending side by side in the longitudinal direction of the tape. Normally, each track is recorded in a direction opposite to that in which the preceding track has been formed. The result is what is known as a serpentine track pattern.

The record tracks of such a serpentine multitrack tape may be individually identified by coded data prerecorded on each such track. Alternatively, in the absence of such track identification data, the head may be positioned transversely of the tape by first precisely locating the head on one edge of the tape to provide a reference head position. The head may then be accessed from this reference position to a desired track location on the tape.

U.S. Pat. No. 4,422,111 to Moeller et al. describes and claims the second mentioned type of head positioning system. It teaches the use of a magnetic tape having prerecorded thereon a plurality of longitudinally readable key patterns of equal length each extending across the entire width of the tape. The key patterns are separated from one another by recordable tape sections of greater equal length, with each pattern uniquely identifying an adjacent record section. These key patterns are also utilized during initial loading operations to determine the precise edge of the tape and thereby provide a reference head position from which all subsequent track locations may be indexed.

Thus, as far as I am aware, the positioning of the head in the transverse direction of a multitrack magnetic tape has conventionally been accomplished by prerecording track identification data or key patterns on the tape. I object to such prerecording of identification data or patterns on magnetic tapes because they require special recording equipment, which has added substantially to the manufacturing costs of the tapes. Also, such prerecorded tapes impose restrictions on their latitude of use. The teachings of Moeller et al. have the additional disadvantage that, since the tape edge is detected by comparison of the output from the playback head, traveling across the width of the tape for reading a key pattern, with a predetermined threshold level, difficulties have been encountered in the determination of this threshold level.

SUMMARY OF THE INVENTION

I have hereby invented how to position a data transducer in a transverse reference position on a multitrack data storage tape without need for prerecording track identification data or other magnetic patterns thereon, or for comparing the reproduced output with a threshold level.

Broadly, my invention is directed to a tape drive unit of the type having a record/playback head assembly for data transfer with a multitrack data storage tape, the head assembly being positionable transversely of the tape extending along a transport path in the drive unit. More specifically, my invention concerns, in the tape drive unit of the type outlined above, a method of, and a system for, transversely positioning the record/playback head assembly on the multitrack data storage tape with respect to one edge thereof in order to enable control over the subsequent positioning of the head assembly with respect to a plurality or multiplicity of record tracks on the tape.

According to the method of my invention, the record/playback head assembly is first positioned on the tape in a selected transverse position thereon with respect to one edge of the tape. Then, in this selected position, a stream of transverse head positioning data is written longitudinally on the tape, and then read, by the record/playback head assembly. The read data are then checked for errors, and errors, if any, are counted in order to determine whether they are less than a predetermined number or not.

Typically, the transverse head positioning data represent a series of serial numbers. Errors found in recording and then reproducing such digital data on the tape significantly and infallibly differ in number depending upon whether the data have been fully recorded on the tape, with the record/playback head fully opposed to the tape, or on only part of the tape, with the head assembly partly projecting laterally beyond one edge of the tape. My invention utilizes this infallible difference in the number of errors for locating the head assembly in a transverse reference position on one edge of the tape.

Therefore, when the errors found in the transverse head positioning data retrieved from any selected transverse position on the tape are less than the predetermined number, the record/playback head assembly may be moved a unit distance toward one tape edge. Then, in this new transverse position on the tape, the transverse head positioning data may again be written, read, and checked for errors. With the repetition of this cycle of operation, the head assembly will be invariably positioned on the tape edge, in which the errors are found to the predetermined number or more.

I have thus succeeded in eliminating the need for use of a prerecorded tape for positioning the head assembly on one edge thereof, or for comparison of the playback head output with a threshold level. The detection of the tape edge on the basis of errors found in recording and reproducing digital data enables the highly accurate positioning of the head assembly on the tape edge.

My invention also provides a system for carrying out the transverse head positioning method summarized above. The system comprises a generator circuit for generating a stream of transverse head positioning data (e.g. those representative of a series of serial numbers) to be recorded on the tape by the record/playback head assembly, and an error detector circuit for checking the data read subsequently by the head assembly. Also, in a preferred embodiment of my invention, a digital microprocessor controller is provided for counting the errors found in the recovered head positioning data.

The microprocessor controller may be factory preprogrammed for implementing the method of my invention. Thus, each time the errors found in the recovered stream of transverse head positioning data prove to be less than the predetermined number, the controller will cause head positioning means of any known or suitable construction to move the head assembly a unit distance toward one edge of the tape.

Preferably, the error detector circuit may comprise two different circuit means, one for checking the read transverse head positioning data for errors on the basis of the known cyclic redundancy check scheme, and the other for detecting errors in the read transverse head positioning data by comparison with that before being recorded on the tape. The record/playback head assembly will be even more precisely positioned on the tape edge by thus dually checking the recovered data.

The above and other features and advantages of my invention and the manner of realizing them will become more apparent, and the invention itself will best be understood, from a study of the following description and appended claims, with reference had to the attached drawings showing a preferred embodiment of my invention.

DESCRIPTION OF THE PREFERRED EMBODIMENT

Figure 1:
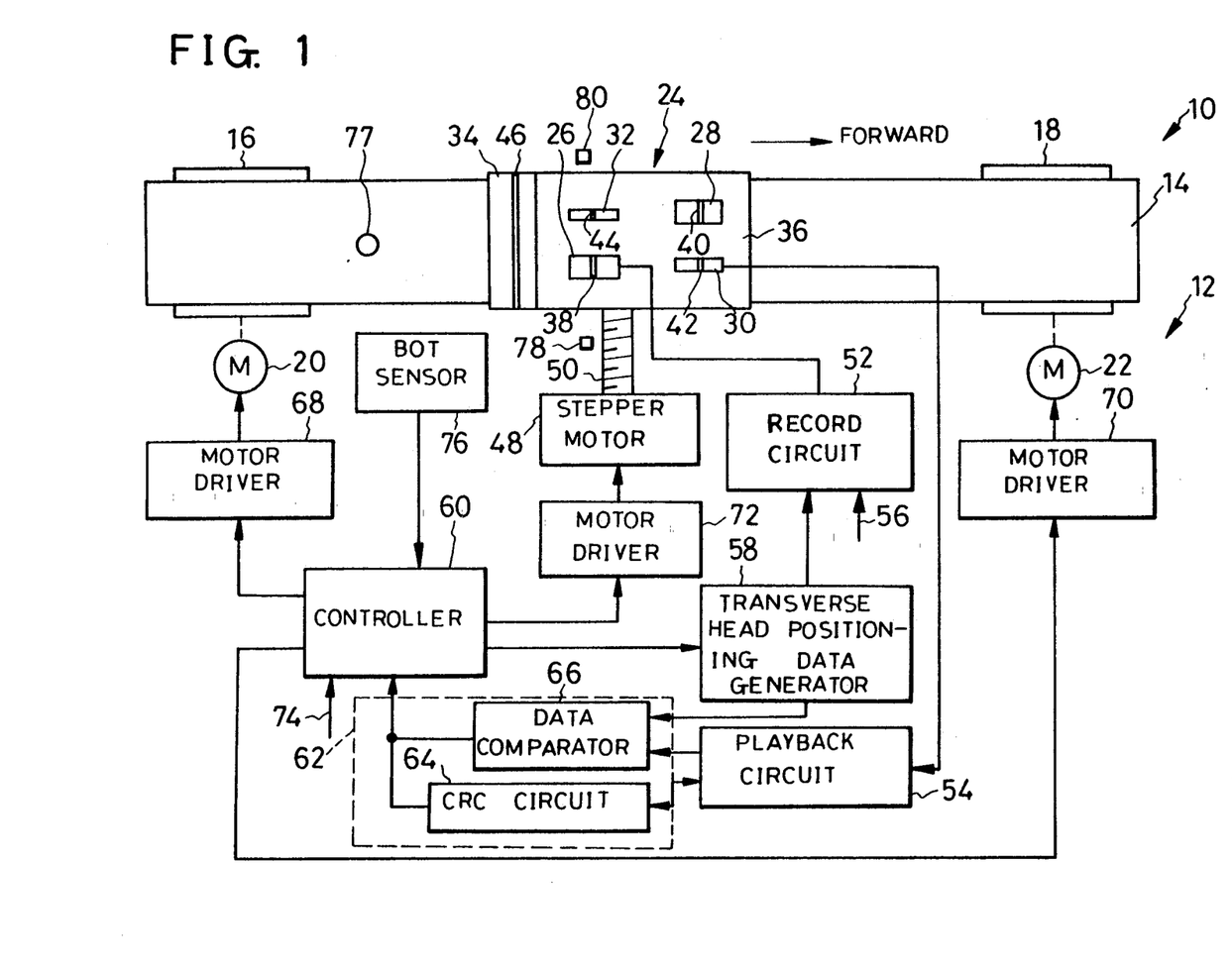
FIG. 1 is a combined elevational and block diagrammatic illustration of a magnetic multitrack tape drive system embodying the principles of my invention.

I will now describe my invention in detail as embodied in the digital multitrack magnetic tape cassette apparatus shown in FIG. 1. Broadly, the illustrated apparatus is a combination of a replaceable tape cassette 10 and a drive unit 12 therefor. The tape cassette 10 includes a length of magnetic tape 14 having its opposite ends anchored to a pair of reel hubs or spools 16 and 18 rotatably mounted within a housing which is not shown.

The drive unit 12 has a pair of electric tape transport motors 20 and 22 for direct driving engagement with the hubs 16 and 18 of the tape cassette 10 as the latter is mounted in position in the drive unit. The tape 14 is to be run bidirectionally by the tape transport motors 20 and 22 along a predefined transport path. I assume that in the illustrated embodiment, the tape 14 travels forwardly from hub 16 to hub 18, as indicated by the arrow in FIG. 1.

Also included in the drive unit 12 is a magnetic head assembly 24 disposed along the transport path of the magnetic tape 14. The head assembly 24 comprises two record heads 26 and 28, two playback heads 30 and 32, and an erase head 34, all mounted to a movable head mount or carrier 36. The record head 26 is for recording of digital data on the tape 14 traveling forwardly, and the other record head 28 for data recording on the tape traveling reversely. The playback head 30 is for reproduction of digital data from the tape traveling forwardly, and the other playback head 32 for data reproduction from the tape traveling reversely.

Figure 2:
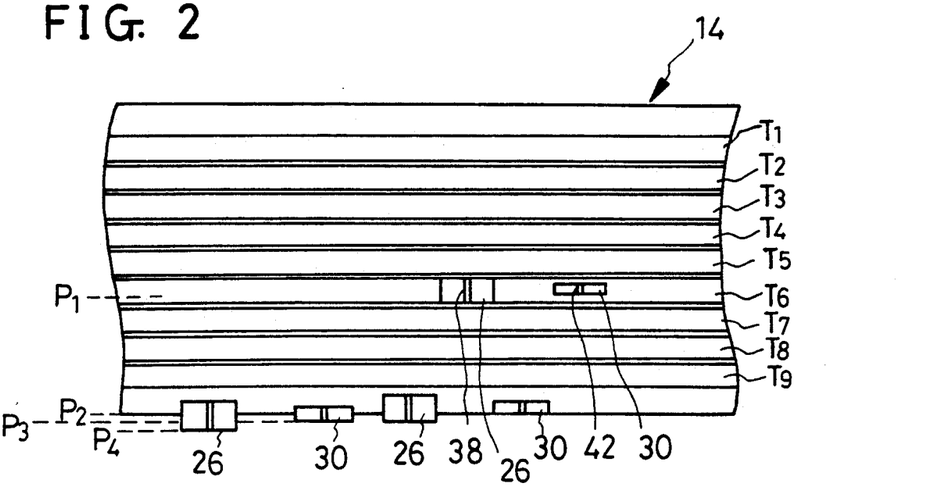
FIG. 2 is an enlarged, fragmentary illustration of the magnetic tape, showing the arrangement of the parallel record tracks thereon, together with the record head and the playback head which are shown in various positions in the transverse direction of the tape for explanation of how the head assembly is positioned on the tape edge according to my invention.

Before proceeding further with the discussion of the head assembly 24, I will refer briefly to FIG. 2 for a study of record tracks on the magnetic tape 14. The tape is therein shown to have nine record tracks $T_1$-$T_9$ extending parallel to each other in the length direction of the tape. Despite the showing of FIG. 2, however, my invention will be of particular utility with magnetic tapes having a much greater number of tracks, say, twenty or even more.

FIG. 2 also shows one record head 26 and one playback head 30 in various transverse positions on the tape 14. These positions are explanatory of how the heads 26 and 30 are positioned on one edge of the tape by the method of my invention. I will therefore refer back to this figure in the course of the subsequent description of operation.

As will be noted also from FIG. 2 taken together with FIG. 1, the record heads 26 and 28 have gaps 38 and 40 each with a width approximately equal to the width of each of the record tracks $T_1$-$T_9$. (By the term "width" of the gap I mean the gap dimension transverse to the tape 14 or to each record track thereon, even though the gap generally extends across the tape.) The playback heads 30 and 32 have gaps 42 and 44 each with a width less than the gap width of each of the record heads 26 and 28 and, therefore, than each track width. The erase head 34 has a gap 46 with a width in excess of the complete width of the tape 14. I understand that the record heads 26 and 28, playback heads 30 and 32 and erase head 34 are conventional in the other details of construction, comprising magnetic cores and windings which are both not shown because of their well known nature.

With reference back to FIG. 1 the complete head assembly 24 is adapted for incremental movement across the width of the tape 14 in order to position the record heads 26 and 28 and the playback heads 30 and 32 on any of the record tracks $T_1$-$T_9$ on the tape, as well as to position the head assembly 24 on a transverse reference position on one edge of the tape. I have employed to this end an electric bidirectional stepper motor 48 coupled to the head mount 36 via a lead screw 50. Thus, with the incremental, bidirectional rotation of the stepper motor 48, the head assembly 24 travels back and forth in minute steps across the width of the tape 14.

I have shown in FIG. 1 that only the record head 26 is connected to a record circuit 52, and only the playback head 30 connected to a playback circuit 54, for the simplicity of illustration. In practice, as is well known in the art, both record heads 26 and 28 are selectively connected to the record circuit 52, and both playback heads 30 and 32 selectively connected to the playback circuit 54.

Receiving over a line 56 digital data to be recorded on the tape 14, the record circuit 52 supplies a corresponding record current to the record heads 26 and 28. Also, in accordance with a feature of my invention, a data generator circuit 58 is connected to the record circuit 52. Under the control of a controller 60 the generator circuit 58 delivers to the record circuit 52 a stream of digital transverse head positioning data to be recorded on the tape 14. I will later explain the transverse head positioning data in more detail. The controller 60 takes the form of a programmable digital microprocessor capable of performing various functions that will become apparent as the description proceeds.

Figure 3:
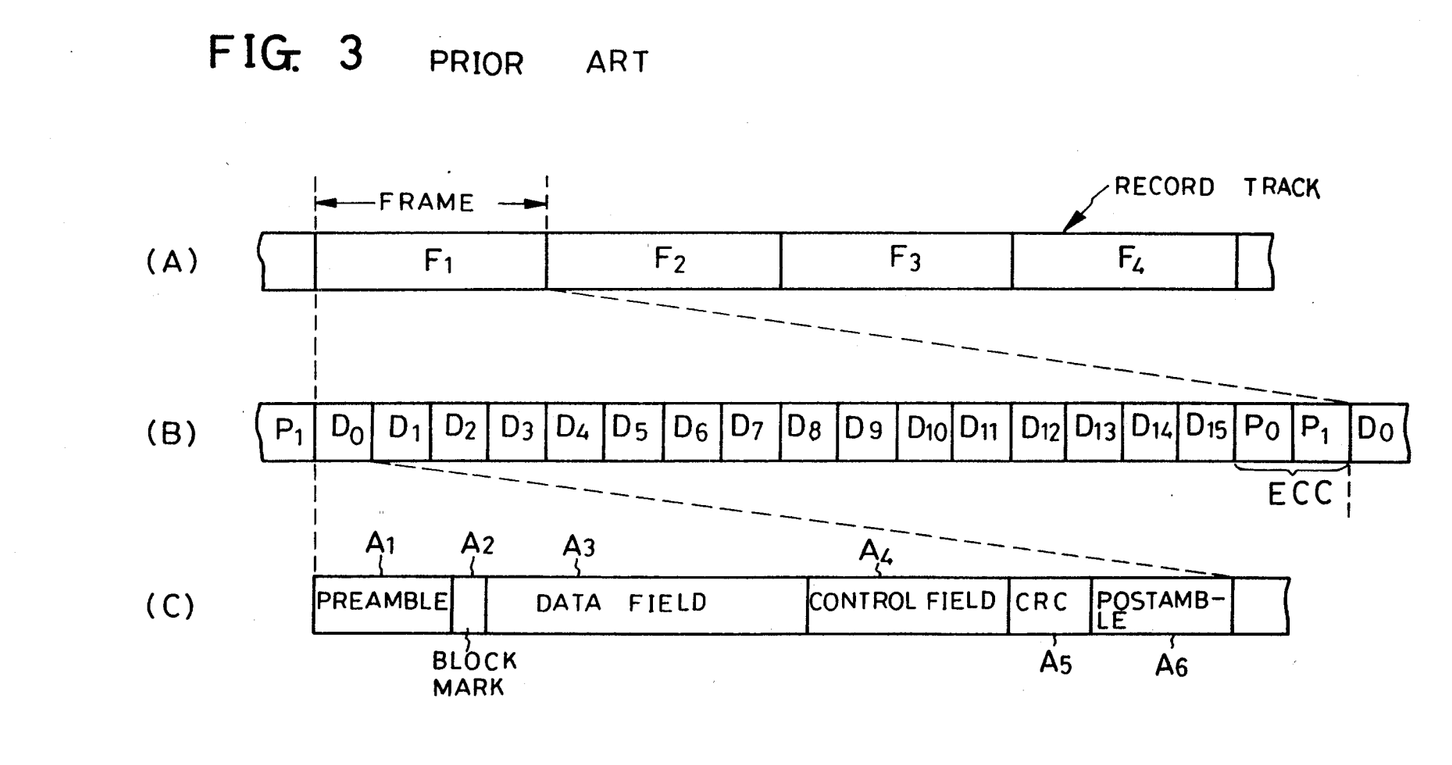
FIG. 3, consisting of (A) through (C), is a schematic illustration of the known format by which data are recorded on the tape in the FIG. 1 system.

Reference is now directed to FIG. 3 for a study of the standard format by which information, inclusive of user data and the transverse head positioning data, is recorded on the tape 14. As shown at (A) in FIG. 3, each of the tracks $T_1$–$T_9$ on the tape is divided into a series of frames $F_1$, $F_2$, $F_3$, etc. FIG. 3(B) indicates that each frame resolves itself into sixteen data blocks $D_0$–$D_{15}$ followed by two error checking and correction (ECC) blocks $P_0$ and $P_1$.

Further, as shown at (C) in FIG. 3, each of the data blocks $D_0$–$D_{15}$ of each frame $F_1$, $F_2$, etc. of each record track on the tape 14 sequentially comprises a preamble $A_1$, a block mark $A_2$, a data field $A_3$, a control field $A_4$, a cyclic redundancy check (CRC) code pattern $A_5$, and a postamble $A_6$. The preamble $A_1$ and the postamble $A_6$ contain magnetic patterns recorded in the form of bursts. The data field $A_3$, typically 512 bytes long, is for the storage of user data as well as the transverse head positioning data according to my invention. The control field $A_4$, typically five bytes long, is for the storage of frame address data, data for distinction between data blocks $D_0$–$D_{15}$ and ECC blocks $P_0$ and $P_1$, and other control data. The CRC pattern $A_5$, typically two bytes long, is used in reading the data on both data field $A_3$ and control field $A_4$ to detect the presence of errors.

With reference back to FIG. 1 the playback circuit 54 conventionally comprises a preamplifier coupled to the playback heads 30 and 32, a differentiator circuit for differentiating the amplified output from the playback heads, a zero volt comparator for comparing the differentiator output with zero volt, and a read pulse generator circuit for shaping the comparator output into read pulses representative of the data read on the tape 14. I have not shown such components of the playback circuit because of their conventional and well known nature.

Connected to both playback circuit 54 and transverse head positioning data generator circuit 58, an error detector circuit 62 comprises a CRC circuit 64 and a transverse head positioning data comparator circuit 66. The CRC circuit 64, per se conventional in the art, checks the read pulses for errors by utilizing the CRC code patterns $A_5$ of FIG. 3(C). The transverse head positioning data comparator circuit 66 compares the transverse head positioning data before being recorded, with that after having been recorded on and read from the tape 14, and puts out an error signal indicative of errors or differences therebetween. The CRC circuit 64 and the transverse head positioning data comparator circuit 66 are both connected to the digital microprocessor controller 60.

The microprocessor controller 60 has outputs connected to tape transport motor driver circuits 68 and 70 and a stepper motor driver circuit 72 for controlling the tape transport motors 20 and 22 and the transverse head positioning stepper motor 48. Also, the controller 60 has an input connected as aforesaid to the error detector circuit 62, another input for receiving a tape edge detect command from an external host system, not shown, over a line 74, and still another input connected to a beginning of tape (BOT) detector 76. A standard component of magnetic tape apparatus of this type, the BOT detector 76 optically detects a hole 77 formed in the tape 14 as a BOT mark. The BOT detector 76 upon detection of this BOT hole 77 signals the controller 60 that the head assembly 24 has been positioned at the beginning of the tape 14.

Inputting the signals from the error detector circuit 62, the unshown host system, and the BOT detector 76, the controller 60 controls the tape transport motor driver circuits 68 and 70, the stepper motor driver circuit 72 and the transverse head positioning data generator circuit 58 in accordance with a control program which is to be introduced into it at the factory. I understand that the control program includes a "Tape Edge Detect" routine according to my invention. The "Tape Edge Detect" routine enables the drive unit 12 to automatically position the head assembly 24 in a transverse reference position on one edge of the tape 14. I will set forth the "Tape Edge Detect" routine in detail in the subsequent description of operation.

I have shown at 78 and 80 in FIG. 1 a pair of limit stops, per se conventional in the art, for limiting the linear movement of the head mount 36, and hence of the head assembly 24, across the width of the magnetic tape 14. Immovably mounted to a stationary part, not shown, of the drive unit, the limit stops 84 and 86 serve to determine approximate transverse limit positions of the head assembly 24. Because of the unavoidable dimensional errors that arise in the manufacture and assemblage of the various related parts of both tape cassette 10 and drive unit 12, and because of the variability of the transverse position of the magnetic tape 14 relative to the head assembly 24, the limit stops 84 and 86 cannot possibly provide any precise reference positions for the head assembly 24 in the width direction of the magnetic tape.

Operation

Let us assume that the tape cassette 10 has been loaded in position in the drive unit 12, with the magnetic tape 14 extending along the predefined transport path, and with the tape transport motors 20 and 22 in driving engagement with the cassette hubs 16 and 18, as shown in FIG. 1. Also, unlike the showing of FIG. 1, I assume that the head assembly 24 has been initialized in a position against the lower limit stop 78 when the drive unit 12 is powered on, as has been known heretofore. The head assembly 24 must be moved from this initial position to a preassigned transverse reference position on one edge of the magnetic tape 14 preparatory to being positioned on any of the record tracks $T_1$–$T_9$ of the tape for data transfer therewith. This movement of the head assembly 24 to the transverse reference position takes place automatically according to the aforementioned "Tape Edge Detect" routine of the control program which has been introduced into the digital microprocessor controller 60.

Figure 4:
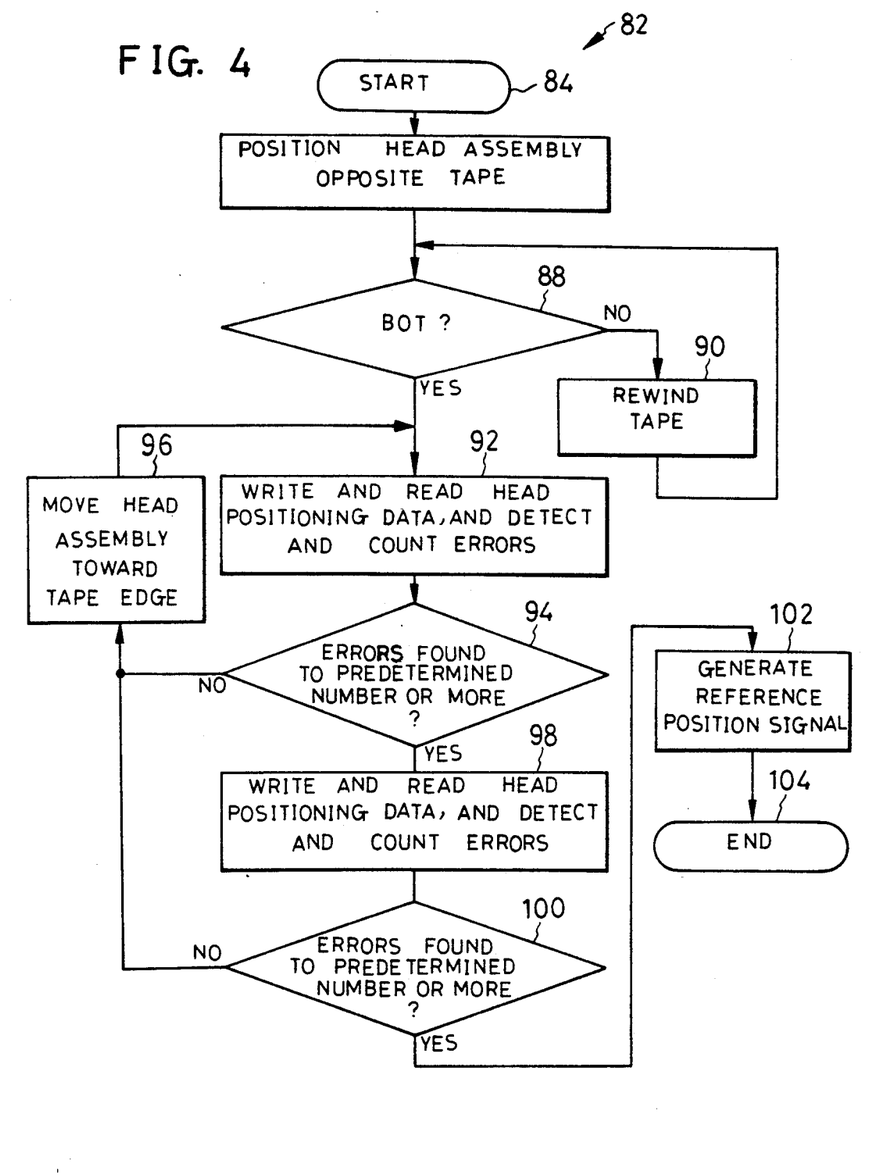
FIG. 4 is a flowchart explanatory of the operation of the preprogrammed microprocessor controller of the FIG. 1 system.
Figure 5:
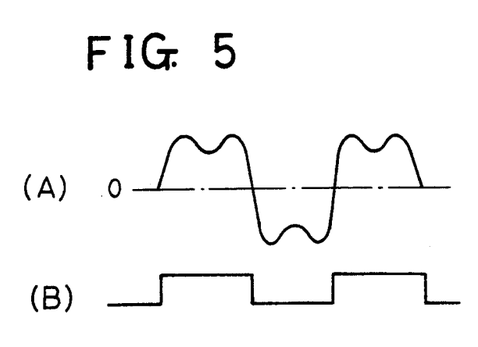
FIG. 5, consisting of (A) and (B), is a representation of waveforms useful in explaining how the head assembly is positioned on the tape edge in the FIG. 1 system FIG. 6, consisting of (A) and (B), is a similar representation of waveforms useful in explaining how the head assembly is positioned on the tape edge in the FIG. 1 system.

I have flowcharted in FIG. 4 the "Tape Edge Detect" routine 82 of the control program according to my invention. The discussion of this routine follows.

The controller 60 is triggered into the "Tape Edge Detect" routine 82 at 84 in response to the tape edge detect command supplied from the unshown host system over the line 74. At a block 86 the head assembly 24 is moved transversely of the magnetic tape 14 to a position opposite the tape. The controller 60 commands the stepper motor driver circuit 72 to that effect, causing the same to step the stepper motor 48 a number of times required for positioning the head assembly 24 opposite the tape 14. Since the head assembly 24 has been initialized in the position against the bottom limit stop 78, there can be known previously the number of steps required for incrementally moving the head assembly from this initial position to the position opposite the tape 14.

At this time, too, any precise positioning of the head assembly 24 with respect to the tape 14 cannot possibly be expected because of the dimensional and manufacturing errors of the transverse head positioning mechanism and the tape cassette 10. Actually, according to my invention, no precise positioning of the head assembly 24 with respect to the tape 14 is required, either. All that is required at this time is that the record head 26 and the playback head 30 of the head assembly 24, which heads are aligned in the longitudinal direction of the tape 14, be disposed in an arbitrary transverse position on the tape, preferably relatively close to its edge to be detected by the rest of the "Tape Edge Detect" routine 82.

Then, at a logical node 88 entitled "BOT", the controller 60 determines on the basis of the output from the BOT detector 76 whether the head assembly 24 is positioned at the beginning of the tape 14 or not. If not, the controller 60 commands at a block 90 the tape transport motor driver circuits 68 and 70 to run the tape 14 until the BOT detector 76 detects the BOT hole 77 at the beginning of the tape.

The answer yes to the "BOT" node 88 directs the routine 82 to a series of cyclic operations comprising a block 92, a node 94 and a block 96. First, at the block 92, the controller 60 causes the transverse head positioning data to be written on the tape 14, then causes the transverse head positioning data to be read, then causes the read data to be checked for errors, and counts the errors. When the errors are not counted to a predetermined number at the node 94, the controller 60 proceeds at the block 96 to cause the head assembly 26 to travel a predetermined number of steps toward the tape edge, before returning to the block 92 for the commencement of another cycle of operations. The same cycle is repeated until the record head 26 and playback head 30 become positioned on the tape edge. I will elaborate in the following on the noted operations involved in this repetitive cycle.

At the block 92 the controller 60 causes the generator circuit 58 to deliver a stream of transverse head positioning data to the record circuit 52 and hence to cause the data to be written on the tape 14 by the record head 26 while the tape is running forwardly. Preferably, the stream of transverse head positioning data represent serial numbers 1-255. These serial numbers will be written by the FIG. 3 format on a required number of data blocks $D_0$-$D_{15}$ on the tape 14. Being subsequently read by the playback head 30 which is aligned with the record head 26 and which has a gap width less than that of the record head 26, the recorded transverse head positioning data will be thoroughly retrieved from the tape. The output from the playback head 30 will be processed into well defined read pulses at the playback circuit 54 before being sent to the error detector circuit 62.

At the error detector circuit 62 the CRC circuit 64 will check the read pulses representative of the transverse head positioning data from each data block on the basis of the CRC data read from that data block. When an error is found in the transverse head positioning data read from any data block, the CRC circuit 64 will signal the controller 60 to that effect. Also included in the error detector circuit 62, the transverse head positioning comparator circuit 66 will compare each transverse head positioning datum fed directly from the generator circuit 58, with that recovered from the tape 14, signaling the controller 60 when an error is found in each transverse head positioning datum recovered from the tape. Thus, in this embodiment of my invention, the error detector circuit 62 dually checks the recovered transverse head positioning data for errors. The controller 60 counts all the errors that may have been found in the complete stream of transverse head positioning data recovered.

Then, at the node 94, the controller 60 determines whether the errors that have occured in reading all the recorded transverse head positioning data are up to a predetermined number or not. If they are not, this fact is taken to mean that the playback head 30 is fully opposed to the tape 14. Therefore, at the block 96, the controller 60 causes the head assembly 24 to travel a unit distance toward the tape edge for the commencement of another cycle of tape edge detect operation.

As the foregoing cycle is repeated several times, the playback head 30 will invariably come to the tape edge and starts overrunning the same. Thereupon, with a gradual decrease in the amplitude of the output from the playback head 30, an increasing number of errors will be found in reading the recorded transverse head positioning data than when the playback head has been fully opposed to the tape.

Reference may be had to FIGS. 2 and 5-7 for a better understanding of the transverse position of the playback head 30 on the tape 14 and the number of errors found in the output therefrom. The position $P_1$ in FIG. 2 may be thought of as the initial arbitrary position of the record head 26 and playback head 30 in which they are both fully opposed to the tape 14. Then, as depicted at (A) in FIG. 5, the differentiated output from the playback head 30 is of such large amplitude that the saddles of its waveform do not cross the zero level. Accordingly, correct read pulses can be obtained as at (B) in FIG. 5. The playback circuit 54 will continue the production of such correct read pulses as long as the playback head 30 remains fully opposed to the tape 14, that is, when the playback head is anywhere between the positions $P_1$ and $P_2$ in FIG. 2. Therefore, as graphically represented in FIG. 7, the number of errors E found in reading the complete transverse head positioning data will remain practically constant while the playback head 30 is being stepped from position $P_1$ to position $P_2$ on the tape.

Figure 6:
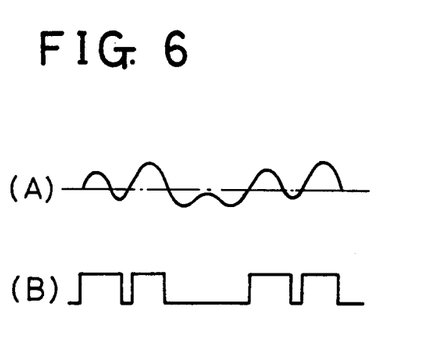
Figure 7:
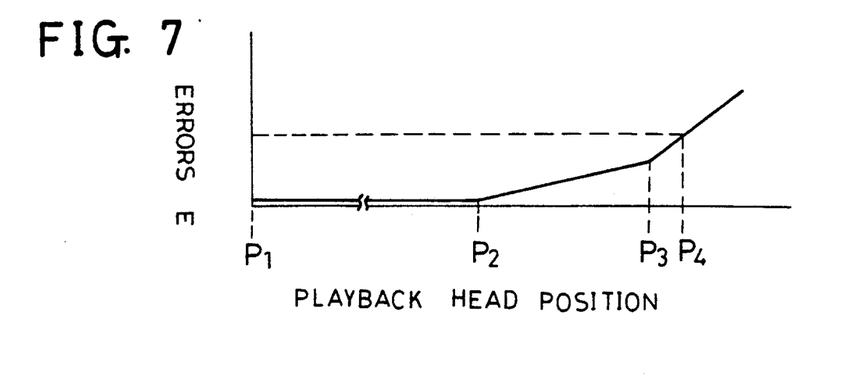
FIG. 7 is a graph plotting the curve of the number of errors found in reading the transverse head positioning data against the position of the playback head in the transverse direction of the tape.

However, as the playback head 30 overruns the tape edge beyond the position $P_2$, the differentiated output from the playback head will decrease in amplitude to such an extent that the saddles of its waveform will cross the zero level, as indicated at (A) in FIG. 6. Consequently, as will be understood from (B) in FIG. 6, correct read pulses will no longer be obtained.

A reference to FIG. 7 again will show that the number of errors in reading the recorded transverse head positioning data gradually increases as the playback head 30 starts overrunning the tape edge beyond the position $P_2$, and increases more sharply beyond the inflection point $P_3$. In this particular embodiment the answer to the logical node 94 in the FIG. 4 flowchart becomes yes when errors are found in reading the recorded data to the number when the playback head 30 is in the position $P_4$ which comes after the inflection point $P_3$.

The playback head 30 will in all likelihood be in the transverse reference position on one edge of the tape 14 when errors are found as above to the predetermined number at the logical node 94. I recommend, however, that this fact be reconfirmed by once again recording the transverse head positioning data, reading the data, and counting errors as at a block 98. Then, at a logical node 100, it may be determined whether the errors are up to, or more than, the predetermined number or not. The answer no to the node 100 returns the routine to the block 96, so that the record head 26 and playback head 30 are returned to the positions fully opposite the tape 14.

If the answer to the node 100 is yes, on the other hand, then it means that the playback head 30, or the complete head assembly 24, has been reconfirmed to be in the transverse reference position on the tape 14. Therefore, at the next block 102, the controller 60 internally generates a tape edge detect signal indicative of the fact that the head assembly 24 has been moved to the reference position on one edge of the tape 13. The "Tape Edge Detect" routine subsequently comes to an end at 104.

Optionally, after generating the tape edge detect signal at the block 102, the controller 60 may be programmed to cause the head assembly 24 to be moved a predetermined distance from the reference position on the tape edge to a second reference position midway between the opposite edges of the tape 14. Then, in this second reference position, the transverse head positioning data may again be written on the tape, read, and checked for errors. If errors are found approximately to the same level as that between the playback head positions $A_1$ and $A_2$ in FIG. 7, then the head assembly 24 is properly positioned on the tape 14.

The subsequent track seeking operation of the head assembly 24 can be largely conventional. Having been moved as above to the first transverse reference position on the tape edge, or to the second transverse reference position midway between the tape edges, the head assembly 24 may be stepped a known number of times for moving the record head 26 or playback head 30 into alignment with any of the record tracks $T_1$-$T_9$ on the tape. The microprocessor controller 72 has a counter built into it for registering data representative of the number of steps between the first reference position and the current position of the head assembly 24 on the tape 14. Thus the microprocessor always knows the current head position.

Possible Modifications

Although I have shown and described my invention in terms of but one preferred embodiment thereof and as applied to tape cassette apparatus, I recognize, of course, that my invention could be embodied in many other widely different forms and applications. The following, then, is a brief list of possible modifications, alterations and adaptations of the illustrated embodiment which will readily suggest themselves to those skilled in the tape drive and allied arts without departing from the scope of my invention.

1. At the block 86 in the FIG. 4 flowchart, the fact that the head assembly was positioned opposite the tape could be confirmed by writing the transverse head positioning data on the tape, reading the data, checking the data for errors, and counting the errors, as at the block 92.

2. The block 86 and node 88 of the FIG. 4 flowchart could be reversed in order; that is, the head assembly could be positioned opposite the tape after making sure that the tape had been rewound to its beginning.

3. The blocks 86 and 90 of the FIG. 4 flowchart could be concurrent; that is, the tape could be rewound to its beginning while the head assembly was being stepped across the tape width to the position opposite the tape.

4. The block 98 of the FIG. 4 flowchart could be concurrent with the blocks 92 and 98; that is, the had assembly could be stepped to the next transverse position on the tape while the transverse head positioning data was being written, read, and checked for errors.

5. The recorded transverse head positioning data could be read while the tape was running reversely or, after having been rewound, forwardly again, instead of by immediately reading the data being written.

6. The retrieved transverse head positioning data could be checked for errors by only either of the CRC circuit 64 and the data comparator circuit 66, instead of by both.

7. The transverse head positioning data could be recorded by an erase head or by a combined record/playback head.

8. My invention may be applied to tape drive units of the kind having but one tape transport motor for use with a magnetic tape cartridge type DC 2000 manufactured by Minnesota Mining & Co.

What I claim is:

1. In a drive unit having a record/playback head assembly for digital data transfer with a multitrack data storage tape, the head assembly being positionable transversely of the tape extending along a transport path in the drive unit, a method of positioning the record/playback head assembly in a transverse reference position on one edge of the multitrack data storage tape in order to enable control over the subsequent positioning of the head assembly with respect to a plurality or multiplicity of record tracks on the tape, which method comprises:
 (a) positioning the record/playback head assembly on the tape in a selected transverse position intermediate a pair of opposite edges of the tape;
 (b) recording a stream of transverse head positioning data longitudinally in the selected transverse position on the tape by the record/playback head assembly;
 (c) reading the recorded stream of transverse head positioning data by the record/playback head assembly;

(d) checking the read stream of transverse head positioning data for errors;

(e) counting errors found in the read stream of transverse head positioning data;

(f) determining whether the errors found in the read stream of transverse head positioning data are less than a predetermined number or not;

(g) moving the record/playback head assembly a unit distance toward one of the opposite edges of the tape if the errors found in the read stream of transverse head positioning data are less than the predetermined number; and (h) repeating steps (b) through (g) until errors are found in the read stream of transverse head positioning data to the predetermined number or more, the record/playback head assembly being in a transverse reference position on said one edge of the tape when errors are found in the read stream of transverse head positioning data to the predetermined number or more.

2. The method of claim 1 wherein the stream of transverse head positioning data is recorded in each transverse position on the tape along with error check data, and wherein the stream of transverse head positioning data on being read subsequently is checked for errors on the basis of the error check data read concurrently with the transverse head positioning data.

3. The method of claim 1 or 2 wherein the stream of transverse head positioning data recovered from each transverse position on the tape is checked for errors by comparison with the stream of transverse head positioning data before being recorded on the tape.

4. The method of claim 1 which further comprises the following steps in order to make sure that the record/playback head assembly has been positioned on the transverse reference position on one edge of the tape:

(a) after errors have been found to the predetermined number or more in the read stream of transverse head positioning data, recording by the record/playback head assembly the stream of transverse head positioning data on the tape in the same transverse position thereon where the errors have been found to the predetermined number or more;

(b) reading the recorded stream of transverse head positioning data by the record/playback head assembly;

(c) checking the read stream of transverse head positioning data for errors; and (d) counting errors found in the read stream of transverse head positioning data in order to see if the errors are up to the predetermined number or more.

5. The method of claim 1 or 4 which further comprises the following steps in order to move the record/playback head assembly across the width of the tape from the transverse reference position on one edge of the tape to a second transverse reference position intermediate the opposite edges of the tape:

(a) after errors have been found to the predetermined number or more in the read stream of transverse head positioning data, moving the record/playback head assembly from the transverse reference position a predetermined distance toward the other edge of the tape across the width of the tape;

(b) recording the stream of transverse head positioning data on the tape by the record/playback head assembly;

(c) reading the recorded stream of transverse head positioning data by the record/playback head assembly;

(d) checking the read stream of transverse head positioning data for errors;

(e) counting errors found in the read stream of transverse head positioning data in order to determine if the errors are approximately equal in number to those found when the transverse head positioning data is recorded on the tape in a position intermediate the opposite edges thereof and, if so, determining the record/playback head assembly to be in the second transverse reference position on the tape.

6. In a drive unit having a record/playback head assembly for digital data transfer with a multitrack data storage tape having a beginning and an end, the head assembly being positionable transversely of the tape extending along a transport path in the drive unit, a method of positioning the record/playback head assembly in a transverse reference position on one edge of the multitrack data storage tape in order to enable control over the subsequent positioning of the head assembly with respect to a plurality or multiplicity of record tracks on the tape, which method comprises:

(a) positioning the record/playback head assembly on the tape in a selected transverse position intermediate a pair of opposite edges of the tape;

(b) rewinding the tape to the beginning thereof;

(c) recording a stream of transverse head positioning data longitudinally in the selected transverse position on the tape by the record/playback head assembly;

(d) reading the recorded stream of transverse head positioning data by the record/playback head assembly;

(e) checking the read stream of transverse head positioning data for errors;

(f) counting errors found in the read stream of transverse head positioning data;

(g) determining whether the errors found in the read stream of transverse head positioning data are less than a predetermined number or not;

(h) moving the record/playback head assembly a unit distance toward one of the opposite edges of the tape if the errors found in the read stream of transverse head positioning data are less than the predetermined number;

(i) repeating steps (c) through (h) until errors are found in the read stream of transverse head positioning data to the predetermined number or more, the record/playback head assembly being in a transverse reference position on said one edge of the tape when errors are found in the read stream of transverse head positioning data to the predetermined number or more;

(j) recording the stream of transverse head positioning data by the record/playback head assembly in the transverse reference position;

(k) reading the recorded stream of transverse head positioning data by the record/playback head assembly in the transverse reference position;

(l) checking the read stream of transverse head positioning data for errors; and (m) counting the errors found in the read stream of transverse head positioning data in order to make sure that the errors are up to the predetermined number or more and, therefore, that the record/- playback head assembly is in the transverse reference position.

7. The method of claim 6 which further comprises:
(a) moving the record/playback head assembly from the transverse reference position a predetermined distance toward the other edge of the tape across the width of the tape;
(b) recording the stream of transverse head positioning data on the tape by the record/playback head assembly;
(c) reading the recorded stream of transverse head positioning data by the record/playback head assembly;
(d) checking the read stream of transverse head positioning data for errors;
(e) counting errors found in the read stream of transverse head positioning data in order to determine if the errors are approximately equal in number to those found when the transverse head positioning data is recorded on the tape in a position intermediate the opposite edges thereof and, if so, determining the record/playback head assembly to be in a second transverse reference position intermediate the opposite edges of the tape.

8. In a drive unit having a record/playback head assembly for digital data transfer with a multitrack data storage tape, the head assembly being positionable transversely of the tape extending along a transport path in the drive unit, a system for positioning the record/playback head assembly in a transverse reference position on one edge of the multitrack data storage tape in order to enable control over the subsequent positioning of the head assembly with respect to a plurality or multiplicity of record tracks on the tape, which system comprises:
(a) tape transport means for driving the tape back and forth along the transport path;
(b) positioning means for positionably moving the record/playback head assembly across the width of the tape extending along the transport path;
(c) a generator circuit for generating a stream of transverse head positioning data to be recorded by the record/playback head assembly longitudinally on the tape in a selected transverse position thereon, the recorded stream of transverse head positioning data being read subsequently by the record/playback head assembly;
(d) an error detector circuit for checking the read stream of transverse head positioning data for errors; and
(e) controller means connected to the error detector circuit for counting errors found in the read transverse head positioning pattern in order to determine whether the errors are less than a predetermined number or not, the controller means being also connected to the positioning means for causing the same to repetitively move the head assembly a unit distance toward one of the opposite edges of the tape each time the errors found in the read stream of transverse head positioning data have proved to be less than the predetermined number, until errors are found in the read stream of transverse head positioning data to the predetermined number or more, the record/playback head assembly being in a transverse reference position on said one edge of the tape when errors are found in the read stream of transverse head positioning data to the predetermined number or more.

9. The system of claim 8 wherein the stream of transverse head positioning data is recorded in each transverse position on the tape along with error check data, and wherein the error detector circuit comprises an error check circuit for checking the read transverse head positioning data on the basis of the error check data read concurrently with the transverse head positioning data.

10. The system of claim 8 or 9 wherein the error detector circuit comprises a data comparator circuit connected to both the record/playback head assembly and the generator circuit for checking the read stream of transverse head positioning data for errors by comparison with the stream of transverse head positioning data before being recorded on the tape.

* * * * *